Figure 1:
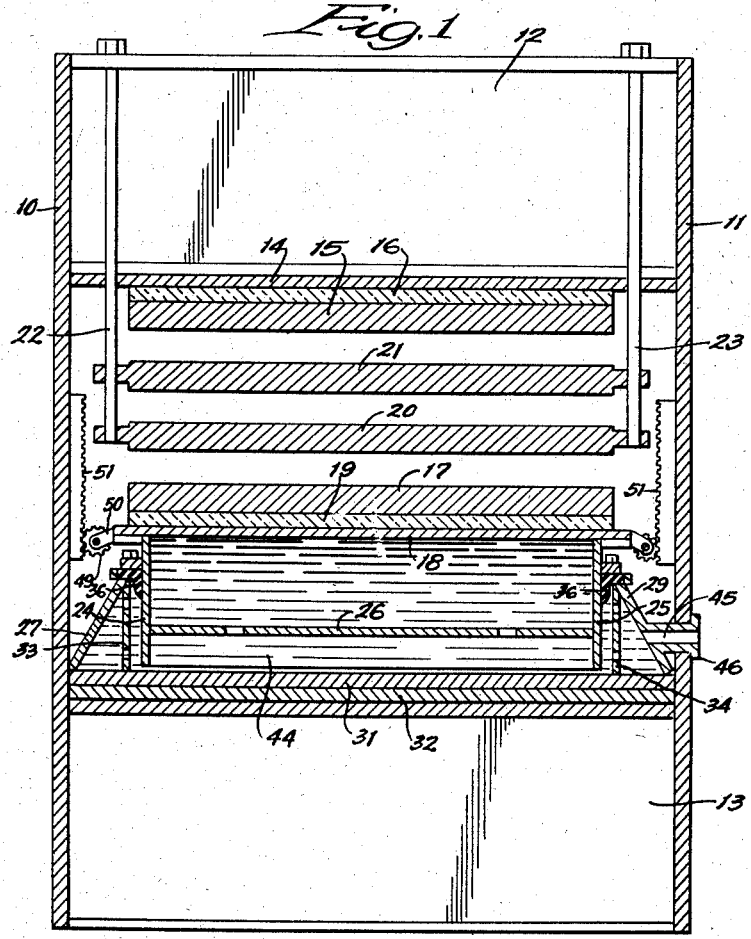

March 3, 1959

J. D'A. CLARK 2,875,797

HYDRAULIC MOLDING PRESS

Filed June 2, 1954

3 Sheets-Sheet 1

INVENTOR:
James d'A. Clark,
BY Dawson, Tilton & Graham,
ATTORNEYS.

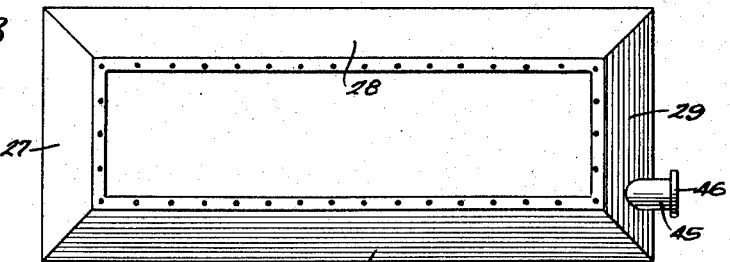
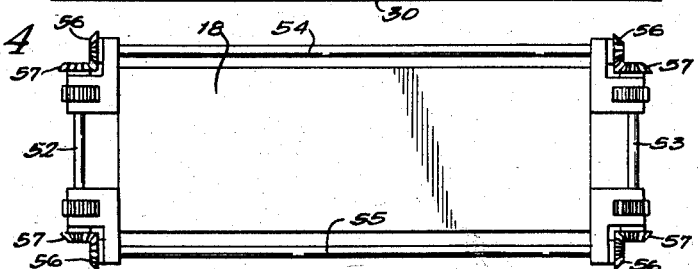
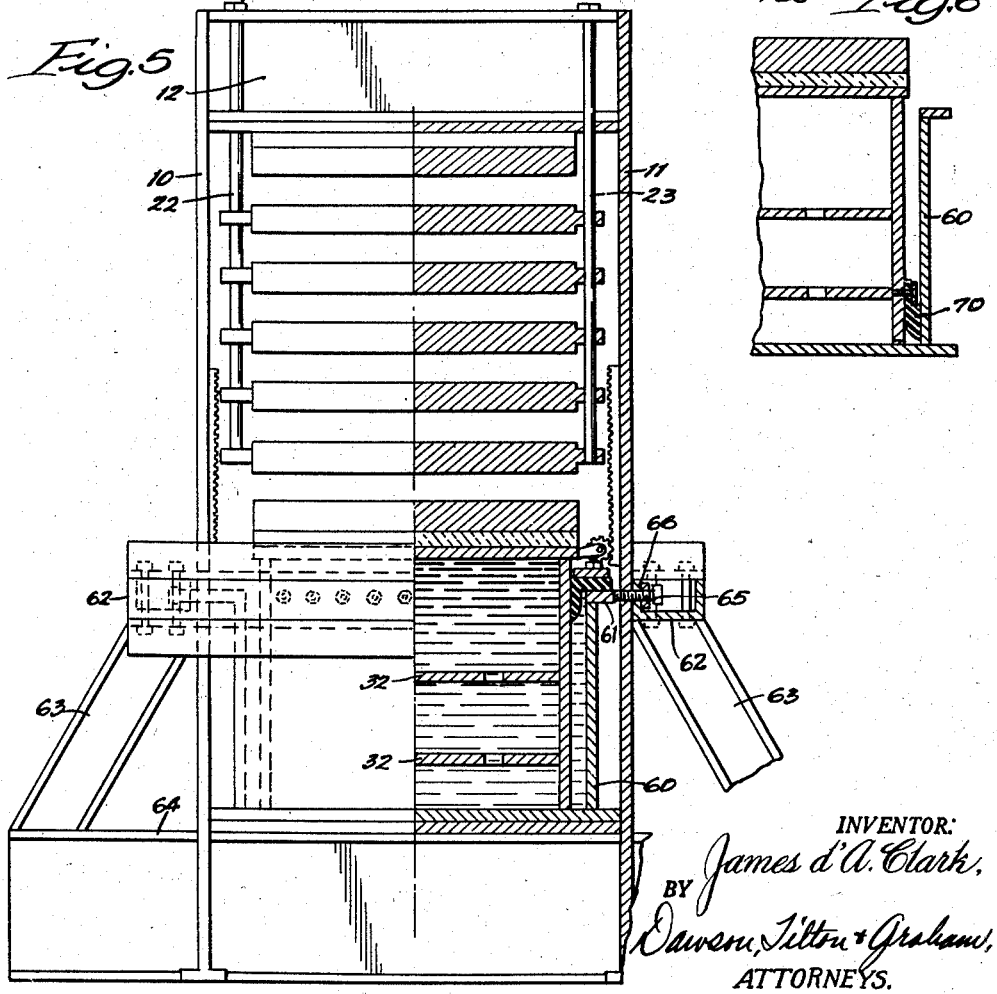

March 3, 1959  J. D'A. CLARK  2,875,797
HYDRAULIC MOLDING PRESS
Filed June 2, 1954  3 Sheets-Sheet 3
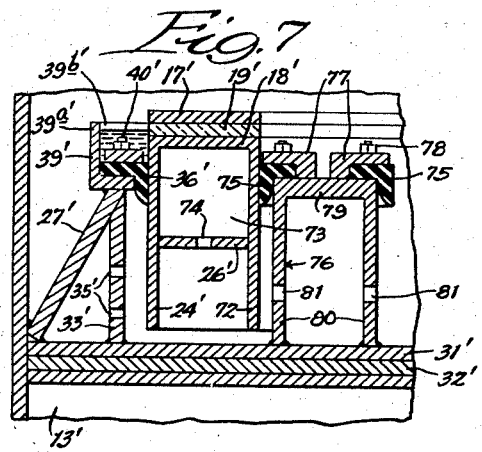
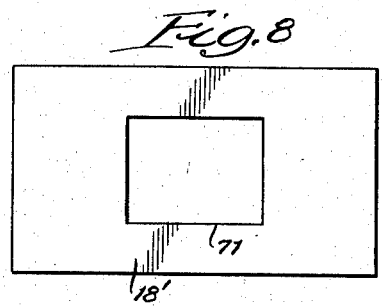
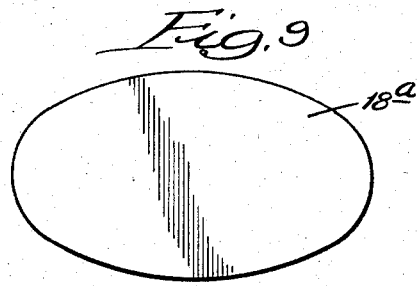
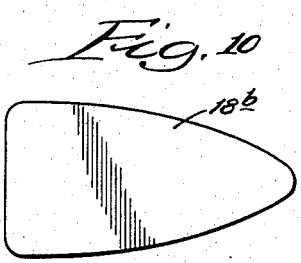
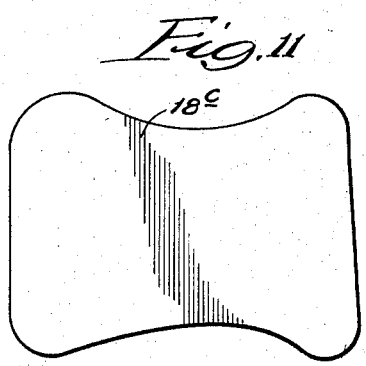
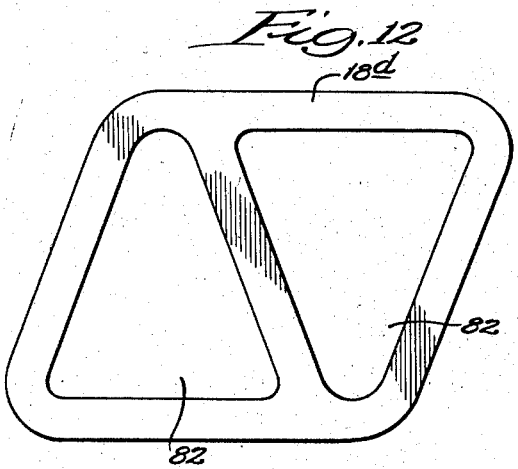
INVENTOR:
James d'A. Clark,
BY
Dawson, Tilton & Graham,
ATTORNEYS.

United States Patent Office 2,875,797
Patented Mar. 3, 1959

2,875,797

HYDRAULIC MOLDING PRESS

James d'A. Clark, Longview, Wash., assignor to Changewood Corporation, Chicago, Ill., a corporation of Illinois Application June 2, 1954, Serial No. 433,962

12 Claims. (Cl. 144—281)

This invention relates to a hydraulic molding press. More particularly the invention relates to an improved hydraulic press for molding sheets of material and is useful, for example, in consolidating resinous treated fibers or sheet stock to form boards, panels, plywood and other laminates of various types. The sheets may be of large dimension, and in shape may be square, rectangular, elliptical, curvilinear with compound curves, etc.

This application constitutes a continuation-in-part of my co-pending application Serial No. 287,215 filed May 10, 1952, now abandoned and which is entitled Hydraulic Molding Press.

Generally in the equipment of the type described there is a stationary platen positioned in cooperative relation with a movable platen shiftable into and out of molding relation therewith. Usually a number of intermediate movable platens are provided in a multiple plate press for the simultaneous consolidation of a plurality of separate molded units. Each piece of equipment also has some means for actuating the movable platen into and out of its molding relation. Customarily, the movable platen has been actuated by one or more centrally located circular rams or pistons operated by fluid pressure. Systems of this character have been found to be subject to a number of objections when applied to presses of the type described having extensive molding surfaces and also where the material being pressed has a shape that is other than circular.

In the operative arrangement the piston or ram has had the movable platen secured thereto. As the piston reciprocates within its cylinder, the movable platen is moved into pressing relation with the stationary platen or perhaps intermediate platens if they are provided, and is thereafter withdrawn from pressing engagement with these platens when the piston is moved downwardly within its cylinder. A paramount difficulty has arisen because, as is well known, the only available rams or pistons have been circular or cylindrical. Therefore, even in the most simple case where a square or rectangular sheet is being pressed portions of the movable platen must overhang the circular ram in order that the platen conform to the square or rectangular shape of the article being pressed. The only alternative to this arrangement which has been possible heretofore, but only when the sheet being pressed is small, is to provide a ram or piston that is so large that the sheet being pressed will fit within the circumference thereof. This of course is quite impractical, for large sheets as, for example, four feet wide and from sixteen to twenty-four feet long. It will be apparent that when compound or complex shapes are required the relationship between the platen and the ram or piston that moves the same is even more dissimilar.

In a hydraulic molding press, hydraulic pressure is applied to the piston or ram to operate the same and because of the requisite platen overhang it is clear that the pressure exerted against the piston is operative on only a relatively small area of the platen and it is difficult to distribute the tremendous locally-applied loads or pressures uniformly over the entire area of the platen whether it be square, rectangular or of some other configuration. In consequence, large amounts of metal have been required to provide proper rigidity and to distribute the load uniformly. These large masses of metal have increased the weight of the press appreciably and of necessity have tremendously increased the initial cost of the press. Such massive reinforcing members cannot be eliminated from the press, for in their absence there would not be the necessary rigidity and there would be appreciable deflection, especially of the movable platens and related structures whereby there would not be uniform distribution of pressure throughout the molding surfaces and the molded product would not have uniform density throughout.

Another of the more important objections to the molding presses now known resides in the inability to compensate properly for the deflections that take place in the platen under various molding conditions which include changes in both pressure and temperature, especially in presses having platens of such large dimensions as upwards of four feet in width and which may be sixteen to twenty-four feet in length. Although the mold parts may be constructed in advance to compensate for one set of molding conditions, such parts unless of exceedingly heavy construction cannot operate properly at other molding conditions and the resulting flexure of the molding parts produces products having uneven thickness and hence products which are inferior.

One reason for this is that practically it is impossible to predict the pressure that will be used in a molding press and, therefore, each press must be designed to operate satisfactorily within a range of pressures. A press is an extremely expensive structure and, therefore, no one is willing to or can afford to experiment with them. Further, a press is usually the key to the production of an industry and unless one is willing to interrupt operations there is no opportunity to experiment with a press. Thus all presses are equipped with massive reinforcing members which permit the press to be operated over a range of pressures and which will give proper rigidity to the platens irrespective of the precise pressures used within the range. This in itself poses serious problems, for the temperatures which will be present in the press are indefinite, but are usually quite high and as a result the expansion of the structural parts is great. Not only, then, is it necessary to provide massive structural parts for reinforcing the platens, etc., but the expansion that takes place within these members poses further design problems.

A still further objection to presses now known resides in the tremendous pressures required in the fluid systems to provide the requisite pressure throughout the area of each platen for consolidating purposes. In order to generate sufficient ram pressure, usually upwards of 2,000 pounds per square inch, special pumps and valves are required and very often a plurality of separate pressure generating systems are harnessed to a single unit for satisfactory operation.

An alternative to such conventional hydraulic presses for certain limited purposes, a fluid operated diaphragm system adapted to engage substantially the entire area of the platen has been used. Although considerably lower pressures are required for actuation of the diaphragm corresponding to the molding pressures desired, the stroke of the press usually is limited to an inch or less by the characteristics of the diaphragm. Diaphragm systems have not been highly regarded, then, and are wholly impractical where it is desired to provide a multiple opening press.

I have discovered that a hydraulic press of the type described can be provided which is substantially free of many of the objectionable features characteristic of presses which have been used heretofore if the piston or ram is made to conform in shape to that of the platen. It is accordingly an object of this invention to provide a piston or ram for actuating the movable platen in a hydraulic molding press which conforms in shape to the shape of the platen and similarly therefore to the shape of the article being pressed, irrespective of the shape of the platen and article. That is, the piston, platen and sheet being pressed may be square, rectangular, oval, elliptical, have compound curves, or be of any other desired shape. Expressed another way, the piston may have any desired non-circular shape. Pistons of such character have not been thought to be feasible heretofore because, as is well known, any cylinder having a shape other than circular will tend to deflect slightly when under pressure and to become more circular. Such deflection, however slight, would result in a cylinder and piston structure that is not practical, because with the type of packing hitherto commonly used, a leak would occur between the piston and cylinder and, with the high pressures involved the hydraulic fluid would soon cut through the packing or sealing means and make a very large channel which would permit the fluid to escape in large quantities and render the structure inoperative.

Another object of this invention is to produce a hydraulic press of the type described which gives a uniform distribution of pressures throughout, yet does not need the rigidity of conventional presses and hence the requirement for a large quantity or mass of metal characteristic of the conventional ram type press to provide the requisite rigidity is not necessary; the length of stroke provided by the ram or piston, however, being sufficient for the consolidation of a number of panels of fibrous material simultaneously in a multiple opening press.

A further object is to produce a rectangular or other non-circular piston and press hydraulically actuated; the ram or piston conforming substantially to the shape of the platen and to the matrix to be pressed and to the dimensions thereof so as to apply pressure uniformly throughout, thus avoiding the effect of deflections and so permitting the use of lesser amounts of structural metal. It is a related object to produce a new and improved multiple platen hydraulic press for use in the manufacture of consolidated sheets or panels of large dimension from fibrous materials. Still a further object of the invention is in the provision of a press wherein the hydraulic pressure applied to actuate and shift the movable platen is simultaneously applied in like magnitude throughout the entire area of the movable platen.

Yet a further object is to provide a shaped cylinder or ram for a consolidating press as described above that is other than circular; for example, triangular, elliptical or kidney-shaped, etc., so that sheets of a substantially corresponding shape and size may be consolidated into an even thickness throughout the entire usable area thereof; the press being provided being less expensive than presses presently known because of the simplified design and reduction in the size of structural members afforded by my novel press construction. Additional objects and advantages will appear as the specification proceeds.

Embodiments of the invention are illustrated in the accompanying drawings, in which—

Figure 2:
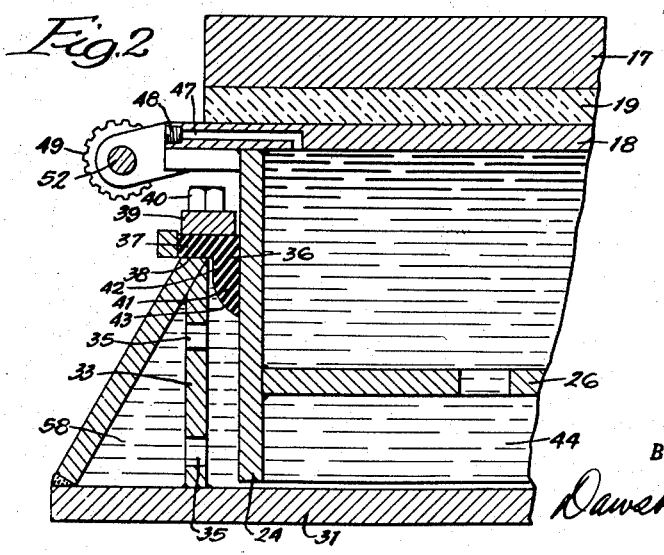

Figure 1 is a schematic sectional elevational view of a hydraulic press embodying features of this invention; Fig. 2 is an enlarged sectional elevational view of a portion of the press shown in Fig. 1; Fig. 3 is a top plan view of the cylinder section separated and apart from the assembly shown in Fig. 1; Fig. 4 is a top plan view of the apparatus illustrated in Fig. 1; Fig. 5 is a schematic elevational view in section of a modified form of hydraulic press embodying features of this invention; Fig. 6 is a sectional elevational view of a fragmentary portion of the press showing a still further modification; Fig. 7 is a broken vertical sectional view showing a further modified form of piston or ram; Fig. 8 is a top plan view of the piston shown in Fig. 7; Fig. 9 is a top plan view showing a further modified form of piston; Fig. 10 is a top plan view showing still a further modification; Fig. 11 is yet another top plan view showing a modified form of the piston; and Fig. 12 is a top plan view showing still another modified form of piston.

As shown in the drawings, a hydraulic press embodying features of this invention comprises a frame section formed of spaced upright metal frame tension members 10 and 11 having an upper and a lower cross brace frame 12 and 13 respectively formed of plate sections or other corresponding structural metal members of high strength. Secured to the underside of the upper cross brace 12 is a mounting plate 14 to which the upper stationary square platen 15 is secured with a layer 16 of heat insulating material therebetween.

The movable square platen 17 is fixed on a bottom plate 18 with a similar layer 19 of heat insulating material therebetween to minimize transfer of heat from the hot platens to the mounting plate and to the body of the molding press. Intermediate the stationary upper platen 15 and the movable lower platen 17, one or more additional platens, such as platens 20 and 21, may be provided suspended on vertically-slidable rods 22 and 23 to maintain a desired spaced relation when in open position. Each of these platens may be channeled for the passage of steam or hot water or provided with electrical resistance heaters for raising the temperature of the platens to the desired level for molding. In the event that a heating and cooling cycle is utilized in the molding operations, then the channels through which the steam or hot water travels may be used also for the passage of cold water for cooling purposes.

The fluid system for actuating the movable platen toward molding relation operates in a type of piston and "cylinder" assembly differing markedly from units which have heretofore been employed in molding presses of the type described. In order to balance the distribution of pressure and in order to permit the use of low pressures during operation, the piston assembly is adapted to cover substantially the entire area of the platen and to correspond substantially to the shape thereof; in the example, square.

The unit corresponding to the piston assembly includes the plate 18 as the piston head and casing walls 24 and 25 depending all around as an inverted vat in sealed relation from the underside of the plate 18 adjacent its edges to provide a housing dimensioned substantially to correspond to the area of the plate and the movable platen 17 associated therewith. A foraminous tension plate 26 joins the casing walls 24 and 25 all around intermediate their ends to resist their tendency to expand outwards when the piston is raised.

The cylinder assembly in which the piston slides comprises a square housing of frusto-pyramidal shape having four upwardly and inwardly inclined walls, two being shown and designated with the numerals 27 and 29, joined at their lower edges, as by welding, to provide a sealing relation with the upper surface of a base plate 31. The base plate is supported by the upper surface of the lower cross beam 13 preferably with a plate 32 therebetween. Upright tension plates 33 and 34, forming a separate square housing are fixed, as by welding, to the underside of the cylinder walls at their upper ends while the lower ends of the tension plates rest on and are secured to the surface of the base plate, as by welding. The tension plates are provided with several openings 35 to permit free passage of fluid.

A sealing relation is established between the outer surfaces of the casing walls 24 and 25 and the upper end portions of the cylinder walls 27, 28, 29 and 30 by means of a gasket 36 of inverted L-shape having one arm portion 37 lying over the upper flattened surface 38 of the cylinder walls to which the gasket member is firmly engaged all around by clamping plates 39 secured to the flattened surfaces by stud and nut members 40. The other arm 41 of the L-shaped gasket projects to partially fill the space between the casing walls 24 and 25 of the piston and the upper portion 38 of the cylinder walls to establish a sealing relation therebetween. For best operation, it is preferred to machine and polish the outer surfaces of the casing walls 24, 25 of the piston to provide for the desired sealing relation while permitting relative movement during actuation of the piston assembly and the platen to and from molding position. The depending portion of the gasket arm 41 is formed to curvilinear shape, as illustrated by numeral 43, so as to improve the sealing relation with the outer walls of the casing as the fluid pressure is increased to actuate the piston assembly in one direction or the other.

Hydraulic fluid 44 is caused to flow into and out of the interior of the housing formed by the cylinder walls through a port 45 provided with a fitting 46 communicating with a suitable pumping device or accumulator (not shown). To bleed air which might be entrapped within the upper portion of the piston housing, a passage 47 is provided in the plate 18 to communicate the space within the housing with the outside atmosphere. During normal operation, the passage is adapted to be sealed by plug 48.

In order to prevent any tilting of the movable platen or mold plate when it is traveling idly up or down, a leveling device is preferably provided embodying a pinion 49 rotatably mounted on an arm 50 extending outwardly from and rigidly secured to corner sections of the plate. Each pinion meshes with a rack 51 fixed to adjacent surfaces of the side frame plates 10 and 11. A pair of pinions on one side are keyed onto a single shaft 52 for conjoint turning movement while the other pair of pinions are keyed onto a separate shaft 53 and the two shafts are integrated in their turning movement by cross shafts 54 and 55 having miter gears 56 on the ends thereof in operative engagement with a miter gear on each end of the main shafts 52 and 53.

In operation, fluid under pressure is admitted to the cylinder housing through the inlet 45. The air trapped in the upper part of the piston housing is bled from the system through passage 47 and then the passage is sealed off. As the fluid is admitted it flows through the space 58 defined by the cylinder housing and then through openings 35 in the tension plates into the space 59 between the piston and cylinder walls. The fluid then flows beneath the casing walls into the space therebetween whereby the platen assembly is caused to rise. It will be apparent that when contact is thereby established between the platens, the pressure of the fluid will be substantially equivalent to the pressure then existing between the platens because the fluid is operative substantially throughout the entire area thereof. As a result, when molding pressures in the order of 150 to 500 pounds per square inch are desired, it is only necessary to build up hydraulic pressure within the cylinder and piston assembly to an amount slightly greater.

Because of the existence of uniform pressures substantially throughout the entire surface of the mold plate or movable platen, unbalance is prevented even in the absence of the very rigid moving structure of the type heretofore provided. Furthermore, at the pressures used for molding, since an upward deflection of the cross brace 12 is compensated by an equal upward deflection of the relatively flexible plate 18 and platens 17, 21 and 22, flexure of the mold plates and platens does not become a problem in avoiding the non-uniformity in molding pressure and variations in the thickness of the molded products heretofore encountered. For example, in a press with a 5-foot span the deflection of the center of the upper beam under 400 pounds per square inch was .017 inch, yet the measured uniformity of the thickness of lead wire spaced between the platen at intervals of 2 inches was less than 0.002 inch. To secure a corresponding small deflection of the 5-foot span, in present construction the steel needed would have to be increased many-fold. As a result, considerable savings in material and considerable reduction in weight of the press and its moving parts may be achieved in accordance with presses embodying features of this invention which provide marked reduction in the initial cost and at the same time, an improvement in its operating characteristics.

It will be apparent that I have produced a hydraulic press which combines the desirable features of both the ram type presses heretofore employed and presses embodying the diaphragm system but without being subject to the objectionable features of either. While the fluid operates on the major portion of the area of the molding platens, the stroke of the press is equivalent to that of the ram type system which, unlike a diaphragm press with its limited stroke, enables the use of multiple platens for simultaneous consolidation of a plurality of panels or boards.

For the hydraulic fluid, use may be made of oils or like substances but it is preferred to make use of water having a rubber lubricant and a rust preventative therein as the hydraulic medium because water is capable of operation under the pressures existing and it is a low cost material that is readily available.

It will be seen that the construction of the piston and cylinder assembly and the location of pinions and racks of the leveling device is such that the assembly can be withdrawn as a unit from one end of the press. Thereafter the piston head 18 may be withdrawn after opening the air vent 47 and gaskets 36 may be inspected or replaced should this become necessary. However, in our press after prolonged continual operation, substantially no deterioration of the gasket is evident.

In the event that a still longer stroke is desired in the molding press, modification may be made in accordance with the illustration in Fig. 5. Instead of inwardly-inclined cylinder walls 27, 28, 29 and 30 braced by tension members 35 and 36, the rectangular cylinder section may be formed of upright side walls 60 having an outwardly-extending flanged portion 61 integral with the upper edges thereof and mounting a channel section 62 all around the frame of the press braced by struts 63 resting upon extension 64 of cross brace member 13. Screw lock nut members 65 and 66 may be used to adjustably brace the flanged portion 60 against the channel sections 62. The entire cylinder assembly may be removed as a unit after loosening the side lock nuts and screws and removing the fastening means securing the end channels to the side channel members. A number of tension plates 32 may be used in this modification to prevent distortion of the piston casing under pressure as it emerges from the cylinder.

In this modification the L-shaped gasket 36 is positioned with one arm clamped onto the upper surface of the flange 61 while the other arm depends between the cylinder wall and the skirt of the piston. As shown in Fig. 6, the gasket member 70 may be fixed onto the lower edge portion of the casing wall of the piston to effect a sealing relation between the casing wall and the cylinder wall which then should be machine smoothed and with the rounded end portion of the gasket lowermost to take advantage of the existing pressure to increase the sealing relation.

In the manufacture of the type of press disclosed herein, the vertical corners of the cylinder and piston may be rounded to a small radius of several inches if desired.

It will be apparent from the foregoing description that by distributing the applied loads to the platens fairly uniformly through the press, minimum quantities of steel may be used in the construction not only of the moving parts but also of the frame. As a result, a press embodying features of this invention may weigh considerably less than half that for the conventional hydraulic presses capable of an equivalent load. With the improvement in construction described herein, especially with a multiple cylinder operated press, considerably less machining and fitting is required and, furthermore, changes resulting from creep after machining and the effect of temperature on the structural parts have practically no influence on the accuracy or smoothness of operation of the press.

In the form of the invention shown in Figs. 7 and 8, the press structure is substantially identical to that shown in Figs. 1 and 2 except that the shape and character of the piston or ram has been changed. Since the press structure is the same, the elements illustrated in Fig. 7 have been designated with the same numbers heretofore used in describing the structure shown in Fig. 1 except that each of the numbers has been primed. In view of this similarity in structure, the elements shown in Fig. 7 which are the same as those shown in Fig. 1 will not be described again since it is believed that such a description would not aid in understanding the function and character of the piston shown in Fig. 7.

By referring to Fig. 8 it is seen that the piston is generally rectangular in shape and is designated with the numeral 18'. The center portion of the piston 18a has been removed and the piston is therefore provided with a generally rectangular opening 71 through the center thereof. The central opening 71 is defined by the vertically-extending inner wall 72 of the piston. The inner wall 72 is secured rigidly to the upper wall or surface of the piston, as is the generally vertical wall 24' which defines the outer periphery of the piston. A chamber 73 is thereby provided and it is defined by the walls 72, 24', and the top wall of the piston. A tension member 26' extends through the chamber 73 intermediate the ends of the side walls 72 and 24' and is in substantially spaced-apart parallel relation with the top wall of the piston. A plurality of openings 74 through the tension member 26' permits hydraulic pressure fluid to completely fill the chamber 73.

The outer wall 24' of the cylinder rides in sealing relation with the seal member or packing 36'. Similarly, the inner wall 72 rides in sealing relation against the sealing member 75. The seal 75 is rigidly secured to the standard 76 by means of the L-shaped clamp members 77 which are mounted upon the standard and are clamped to the seal by means of the studs 78. The standard 76 has a top wall 79 and side walls 80 depending therefrom which are welded or otherwise rigidly secured to the member 31'. A substantially closed structure is provided by the standard 76 but hydraulic pressure fluid is permitted to enter the interior thereof through the ports 81.

In operation of this structure, pressure fluid is admitted into the apparatus and it flows through the ports 35' and into the interior of the piston 18' or into the chamber 73 provided thereby. At the same time, the pressure fluid will flow into the interior of the standard 76 through the ports 81. The increase in pressure under the top wall of the piston 18' and under the tension member 26' will cause the piston to move upwardly and with it will move upwardly the members 19' and the platen 17' which is carried by the piston. The walls of the piston are maintained in sealing engagement with the sealing members or packing 36' and 75. It is seen, then, that the operation of this modification is the same as the operation of the structure shown in Fig. 1 and heretofore described. It will be clear that the upper stationary platen and any intermediate platens provided in the press will have a configuration that conforms substantially to the shape of the piston 18' and the platen 17' carried thereby. The sheet material formed in the pressing operation will, of course, have a configuration that is substantially the same as that of the piston 18' and that shape is best shown in the plan view of the piston in Fig. 8.

Preferably, as shown in Fig. 7, the clamping member 39' may be equipped with a vertical flange 39a' that defines a reservoir 39b' adapted to receive a lubricant therein such as water, ethylene glycol and colloidal graphite.

In Figs. 9 through 12, further forms of the piston are illustrated. In each case the piston will be provided with an upper wall or surface and depending therefrom will be a peripheral side wall defining and conforming to the shape of the piston shown in the figures of the drawing. In Fig. 9 the piston is designated with the numeral 18a and it as well as the platen that will be carried thereby are generally elliptical. In Fig. 10, on the other hand, the piston 18b is shaped like an iron or is generally parabolic. In Fig. 11 the piston 18c is generally in the shape of a dumbbell, while in Fig. 12 the piston 18d is generally in the shape of a parallelogram. The latter illustration shows how the piston may be made to conform to the over-all shape provided by two separate articles or sheets 82 which are to be pressed in a single pressing operation. The sheets 82, for example, might be fibrous board that it is desired to consolidate in a pressing operation.

Irrespective of the form of the piston, the seal member provides a tight seal with the walls thereof and prevents leakage. Even though the cylinder during a pressing operation when fluid pressure is applied thereto tends to assume a more nearly round shape, in all cases the seal will tend to follow and conform to the shape of the cylinder. Therefore, even though the cylinder becomes more round, the seal follows the deflection of the cylinder and will always maintain a tight sealing relation between the cylinder and piston.

It is noted that in all of the embodiments shown the seal member provides a downwardly-extending leg having a rounded or arcuate tip that is spaced slightly from the walls of the cylinder. Therefore, pressure fluid is exerted laterally against the arcuate end portion of the seal and forces it tightly against the walls of the piston. The seal is flexible insofar as it is able to follow the changes in shape of the cylinder and piston and tends to fill in any space therebetween caused by the rounding deflection of the cylinder or of both.

While in the foregoing specification embodiments of the invention have been set out in considerable detail for purposes of illustration, it will be apparent to those skilled in the art that considerable changes may be made in these details without departing from the spirit and principles of the invention.

I claim:

1. In a hydraulic molding press structure, an upper stationary platen and a lower platen adapted to be moved into pressing relation with said upper platen, a sleeve mounted below said lower platen and providing a chamber therein, a ram mounted for reciprocatory movement within said sleeve and spaced from said sleeve and carrying said lower platen, hydraulic means for reciprocating said ram within said sleeve, and seal means interposed between said sleeve and said ram for providing a liquid-tight seal therebetween, at least said lower platen being noncircular and said sleeve and ram conforming substantially to the noncircular configuration thereof, said ram being of substantially the same size and having substantially the same dimensions as said lower platen.

2. In a hydraulic molding press equipped with platens adapted to be moved into pressing relation with each other, a hollow sleeve provided by said press, a ram mounted for reciprocatory movement within said sleeve, and spaced from said sleeve, hydraulic pressure means arranged with said ram for reciprocating the same, and a seal member interposed between said sleeve and said ram for providing a substantially liquid-tight seal therebetween, said ram being non-circular and corresponding substantially in size and shape to a non-circular matrix to be molded in said press.

3. The structure of claim 2 in which said ram is generally rectangular.

4. The structure of claim 2 in which said non-circular ram is curvilinear.

5. The structure of claim 2 in which said ram is provided with an enlarged opening through the center portion thereof.

6. In a hydraulically operated molding press having a movable platen and a stationary platen both with extensive working faces, a hydraulically operated piston assembly dimensioned substantially to correspond with the faces of said platens in size and shape, a cylinder assembly having an opening for receiving said piston assembly therein for reciprocatory movement and being in sealing relation therewith, said piston assembly being spaced from said cylinder assembly, and means for introducing fluid under pressure into said cylinder assembly whereby the piston is actuated to effect operation of said movable platen, the faces of said platens being dimensioned to correspond to the shape of an article being pressed and which is non-circular.

7. The structure of claim 6 in which packing is provided between the piston assembly and cylinder assembly to provide a fluid-tight seal therebetween.

8. In a hydraulic molding press, a frame, a sleeve of non-circular cross section carried by said frame, a casing having a cross section corresponding to the cross section of said sleeve and reciprocably mounted in said sleeve, said casing being spaced from said sleeve, seal members interposed between said sleeve and said casing, the top wall of said casing providing a movable platen of a perimeter corresponding to and having a size and shape approximating the cross section of said casing, whereby pressure applied to the bottom of said casing is uniformly distributed throughout the surface of the platen-providing top wall thereof, and means for applying hydraulic pressure to the bottom of and into said casing.

9. The structure of claim 8, in which said non-circular casing is generally rectangular both internally and externally, and in which said seal members are yieldable and are constructed to follow the contour of the side walls of said casing.

10. A structure according to claim 9, in which said frame is equipped with means for opposing tilting of said casing when said casing is traveling idly up or down.

11. In a hydraulic molding press, a sleeve of non-circular cross section, a piston of corresponding non-circular cross section reciprocably mounted in said sleeve and spaced from said sleeve, seal members interposed between said sleeve and said piston, said piston carrying a platen on the top surface thereof having a cross-sectional size and shape corresponding to said piston and a matrix to be pressed, and means for applying hydraulic pressure to the bottom of said piston.

12. The structure of claim 11, in which a frame is associated with said sleeve, said frame carrying means for opposing tilting of said piston assembly when the same is traveling idly up or down.

References Cited in the file of this patent

UNITED STATES PATENTS

| 1,332,457 | Burkhardt | Mar. 2, 1920 |
| 1,436,177 | Krause | Nov. 21, 1922 |
| 1,529,721 | Ross | Mar. 17, 1925 |
| 1,845,232 | Brandenburg | Feb. 16, 1932 |
| 2,338,329 | Hermanns | Jan. 4, 1944 |
| 2,369,797 | Rappl | Feb. 20, 1945 |
| 2,550,882 | Sturm | May 1, 1951 |

FOREIGN PATENTS

| 816,179 | Germany | Oct. 8, 1951 |